Figure 1:
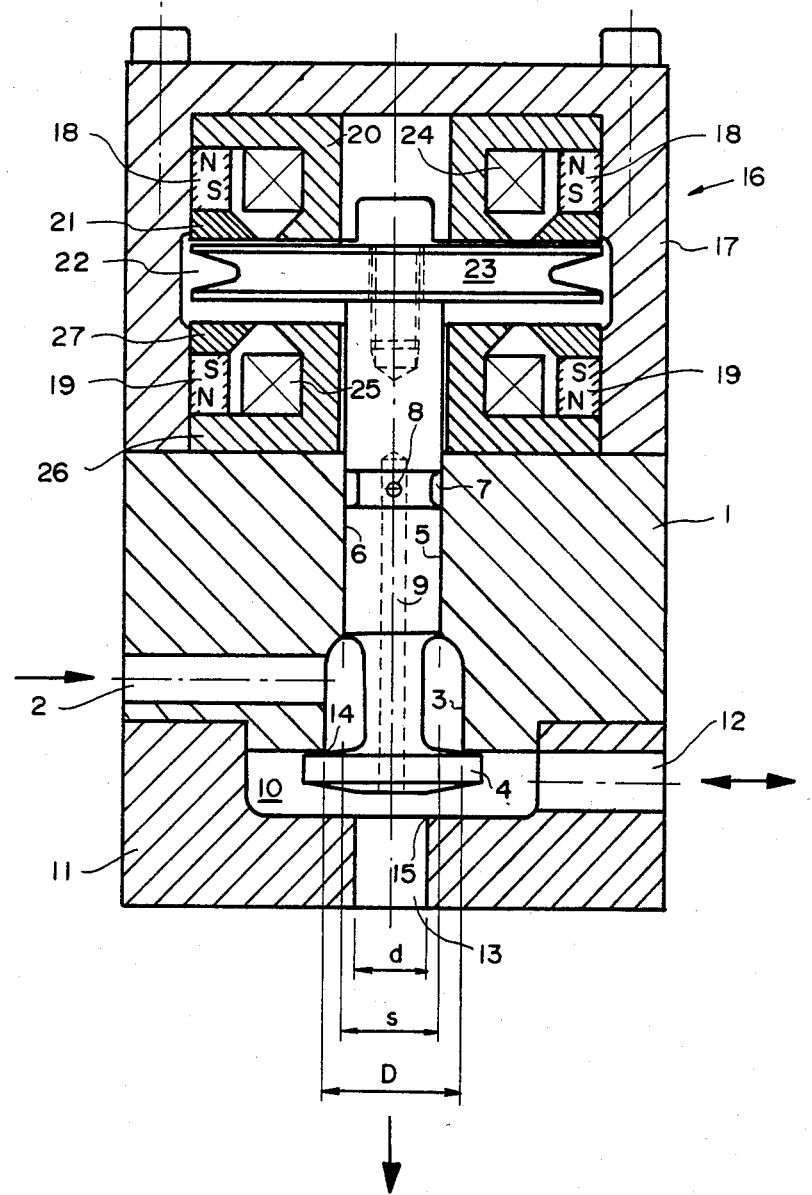

United States Patent [19]

Steiger

[11] Patent Number: 4,664,150

[45] Date of Patent: May 12, 1987

[54] CHANGEOVER VALVE FOR CONTROLLING THE THROUGHFLOW OF A PRESSURE MEDIUM

[75] Inventor: Anton Steiger, Illnau, Switzerland

[73] Assignee: Sulzer Brothers Limited, Winterthur, Switzerland

[21] Appl. No.: 591,488

[22] Filed: Mar. 20, 1984

[30] Foreign Application Priority Data

Mar. 24, 1983 [CH] Switzerland .................. 1615/83

[51] Int. Cl.⁴ .................. F16K 11/048; F16K 31/08
[52] U.S. Cl. .................. 137/625.27; 137/625.5; 251/68; 251/65
[58] Field of Search ........... 137/625.65, 625.5, 625.25, 137/625.27, 102, 103, 104, 529, 106; 251/68, 137, 65, 66, 67, 70, 74, 75

[56] References Cited

U.S. PATENT DOCUMENTS

| | | | |
|---|---|---|---|
| 122,544 | 1/1872 | Westinghouse, Jr. | 137/102 |
| 212,972 | 3/1879 | Osgood | 137/102 |
| 775,054 | 11/1904 | Waterman | 251/70 |
| 961,821 | 6/1910 | Walker | 137/625.27 |
| 2,273,171 | 2/1942 | Bennett | 137/102 |
| 2,410,079 | 10/1958 | Beeghly | 251/68 X |
| 2,980,139 | 4/1961 | Lynn | 137/625.5 X |
| 3,727,631 | 4/1973 | Suezawa et al. | 137/625.27 X |
| 4,051,862 | 10/1977 | Haytayan | 137/625.27 X |
| 4,128,110 | 12/1978 | Haytayan | 137/625.27 X |
| 4,253,493 | 3/1981 | English | 251/137 X |

FOREIGN PATENT DOCUMENTS 2716790  6/1978  Fed. Rep. of Germany .
13401  12/1901  Sweden ..................... 251/68

Primary Examiner—Martin P. Schwadron
Assistant Examiner—John S. Starsiak, Jr.
Attorney, Agent, or Firm—Kenyon & Kenyon

[57] ABSTRACT

The valve seats and the valve stem of the changeover valve have different diameters from one another so that the pressure medium applied a drive force to actuate the valve. The control system is a simple and purely passive retention system without external drive, the retention being triggered by a pulse-like electric signal. The signal energy produced and transmitted within electronic control systems suffices to actuate the valve, no additional drives being necessary for such actuation.

8 Claims, 2 Drawing Figures

U.S. Patent  May 12, 1987  Sheet 2 of 2  4,664,150

CHANGEOVER VALVE FOR CONTROLLING THE THROUGHFLOW OF A PRESSURE MEDIUM

This invention relates to a changeover valve for controlling the throughflow of a pressure medium.

Heretofore, various types of changeover valves have been known for controlling the throughflow of a pressure medium. For example, one known changeover valve is described in German O.S. No. 31 19 049 wherein the valve has a lid or disc which is secured to a stem and which is actuated by an actuating mechanism in order to move from one stable end position into a second stable end position. In this valve, the lid is retained on a respective valve seat in both end positions by the actuating mechanism and is loaded on at least one side by a pressure medium. Generally, these types of valves are constructed so that the valve actuating mechanism has an active external drive which provides the energy required to move the valve lid. The drives used are usually pneumatic or hydraulic or electromagnetic systems, for instance, solenoids.

In cases where electronic means are used to produce signals for triggering the movement of the valve lid in either direction, the energy of the electronic means is usually not sufficient to ensure that the valve lids move. Consequently, additional actuating drives must be provided and the electronic means used merely to trigger the actuating drive. However, the need to provide active drives for such valves make the control and actuating systems very expensive and liable to disturbances.

Accordingly, it is an object of the invention to provide an electronically controlled changeover valve which does not require an additional external drive.

It is another object of the invention to provide a changeover valve which is able to employ the pressure medium being controlled as a means to move a valve lid.

It is another object of the invention to provide a changeover valve which is of relatively inexpensive construction.

It is another object of the invention to minimize disturbances in the control of a changeover valve.

Briefly, the invention provides a changeover valve for controlling a throughflow of a pressure medium. The valve includes a valve lid which is movably mounted between a pair of stable end positions for loading at least on one side by the pressure medium, a stem of given diameter which is secured to and which extends from the lid and a pair of valve seats each of which is disposed at a respective end position of the valve lid for seating of the lid thereon. In addition, the valve seat nearest the stem has a diameter greater than the stem diameter while the valve seat distal from the stem has a diameter less than the stem diameter. A mechanism is also provided for retaining the valve lid in each respective end position.

As a consequence of this construction, in each of the two end positions, the valve lid experiences resulting forces which are produced by the pressure medium to be controlled and which move the valve in the required direction from whichever end position the valve happens to be occupying. The energy required to move the valve lid is thus provided by the pressure medium itself. Very often, the pressure medium is at a high pressure, for instance, a pressure of 1,000 bar. Thus, an additional external drive for the valve becomes unnecessary.

During operation, all that the actuating mechanism need do is to retain the valve in each of the two end positions. That is, the actuating mechanism becomes a passive retaining element which ceases to be "responsible" for moving the valve.

The retention provided by the actuating mechanism can, with advantage, act directly on the valve lid or stem if a simple construction providing relatively short changeover times is required. A direct retention is suitable more particularly for small fast-acting valves.

Conveniently, when relatively large valve forces are to be encountered, the actuating mechanism may act on the valve lid or stem indirectly by way of a locking means. This indirect retention is used particularly for large valves which move relatively slowly.

Figure 2:
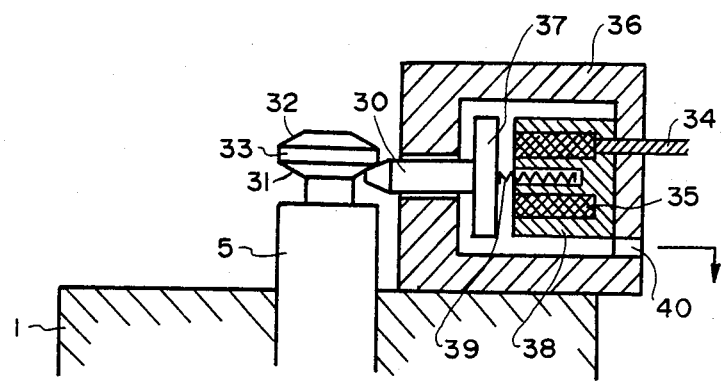

These and other objects and advantages of the invention will become more apparent from the following detailed description taken in conjunction with the accompanying drawings wherein:

FIG. 1 illustrates a longitudinal sectional view through a changeover valve constructed in accordance with the invention; and FIG. 2 diagrammatically illustrates a sectional view of a changeover valve employing a locking means in accordance with the invention.

Referring to FIG. 1, the changeover valve is constructed to control a throughflow of a pressure medium. As shown, the valve has a valve casing 1 having an inlet duct 2 for receiving a flow of hydraulic pressure medium from a suitable pressure medium supply (not shown). In addition, the valve casing 1 has a domed chamber 3 which communicates with the inlet duct 2 at a terminal end and which is open at the bottom, as viewed. The chamber 3 is closed by a dished valve lid 4 which is secured to the bottom end of a stem 5 which extends through a bore 6 in the valve casing 1 and projects from the top of the casing 1.

The valve stem 5 has one part which is slidably mounted in the casing 1 which is of a given hydraulically effective diameter s while a reduced part is disposed in the region of the chamber 3.

The stem is also formed with a second annular reduction 7 about half way of its length, with the reduction 7 communicating by way of horizontal bores 8 with a longitudinal bore 9 extending within the stem to that side of the valve lid 4 which is distal from the stem 5. The flow path formed by the reduction 7 and bores 8, 9 serves to remove leakage hydraulic fluid.

The valve lid 4 and stem 5 are thus mounted in the casing 1 in a freely floating manner.

The changeover valve also has a base 11 secured to the valve casing 1. This base 11 defines a trough-like recess 10 which is aligned with the chamber 3 to receive a flow of pressure medium as well as a control duct 12 and a discharge duct 13 each of which extend from the recess 10. As shown, a first valve seat 14 is provided at the exit end of the chamber 3 of the valve casing 1 while a second valve seat 15 is provided at the entrance end of the discharge duct 13 in the base 11. In addition, the valve lid 4 is disposed between the valve seats 14, 15 within the recess 10 so as to seat on one or the other valve seat 14, 15 in a stable end position thereof.

In use, the hydraulic pressure medium which is supplied to the inlet duct 2 and chamber 3 passes through the control duct 12 to and from an element (not shown) which is to be operated, such as an injection valve of an internal combustion engine. At this time, the valve lid 4 seats on the valve seat 15. When the valve lid 4 seats against the valve seat 14, the hydraulic pressure medium may discharge through the discharge duct 13 to a collector or the like (not shown).

The valve lid 4 thus opens and closes the flow path extending from the chamber 3 to the control duct 12 while simultaneously closing and opening the flow path from the control duct 12 to the discharge duct 13. Of note, the discharge duct 13 is always pressure-less.

As indicated in FIG. 1, the diameter of the valve seat 14, i.e. the valve seat nearest the stem 5, has a diameter D greater than the stem diameter s while the valve seat 15 distal from the stem 5 has a diameter d less than the stem diameter s. Because of the difference between the diameters D and s, when in the top position, seating on the valve seat 14, the valve lid 4 experiences a resulting downwardly directed force which corresponds to the product of the hydraulic medium pressure with the annular area $F_D - F_s$. In this case, $F_D$ denotes the cross-sectional area of the valve seat 14 while $F_s$ denotes the cross-sectional area of the valve stem 5.

Conversely, when the valve lid 4 engages with the valve seat 15, the valve is driven by the resulting force corresponding to the pressure of the hydraulic pressure medium multiplied by the annular area $F_s - F_d$ wherein $F_d$ denotes the cross-sectional area of the valve seat 15. The movement of the valve lid 4 upon approaching either of the valve seat 14 or the valve seat 15 is damped automatically by the opposing force of the hydraulic pressure medium.

Actuation of the valve by the pressure medium is controlled by a mechanism 16 which is contained within a casing 17 secured to the valve body 1 as by bolts. This mechanism is in the form of an electromagnetic system which includes a pair of permanent annular magnets 18, 19 having magnetic fields of force which are closed by rings, cores or pole shoes 20, 21; 26, 27, with an air gap 22 being formed between the magnets 18, 19. In addition, an armature 23 is disposed in the air gap 22 and is secured to the valve stem 5 which projects upwardly from the valve casing 1.

As indicated, the magnets 18, 19 are disposed to opposite sides of the armature 23 so that the armature 23 can be retained in a top position by the upper magnet 18 and in a bottom position by the magnet 19 against the resulting hydraulic forces which act on the valve lid 4.

The electromagnet system also includes a pair of windings 24, 25 each of which is disposed on an opposite side of the armature 23 and received in a respective core 20, 21; 26, 27. The windings 24, 25 are so connected to a power supply (not shown) that an electrical current passing therethrough creates a magnetic field in opposition to the magnetic field of the respective permanent magnet 18, 19. Consequently, a current pulse so weakens the magnetic field produced by a permanent magnet 18, 19 that the armature 23 is released and "oscillates" from one "retained" position into the other.

Because of the substantial magnetic flux which can be produced by means of the permanent magnets 18, 19, the gap between the armature 23 and the pole shoes 20, 21 and 26, 27 can be fairly substantial. Thus, manufacturing tolerances and differences due to heat expansion can be compensated. Energization of the windings 24, 25 to produce an opposing flux and to neutralize the effect of the permanent magnets 18, 19 temporarily is very brief so that the resulting pulse-like current causes substantially no heating of the system.

In operation, with the changeover valve in the position illustrated in FIG. 1, the valve lid 4 seats against the valve seat 14 so as to close off the flow duct from the chamber 3 to the control duct 12. At this time, a flow path is opened from the control duct 12 into the discharge duct 13.

If the changeover valve is to be actuated so as to deliver pressure medium to the control duct 12, a suitable signal is delivered to the winding 24 so as to release the armature 23. Upon release, the hydraulic pressure medium acting on the area $F_D - F_s$ of the valve lid 4 causes the valve lid 4 to move downwardly and to seat against the valve seat 15. The pressure medium then flows to the control duct 12.

If the valve is to be changed over from this latter position, a signal is delivered to the winding 25 so as to release the armature 23 from the permanent magnet 19. At this time,—because the lid 4 seats solely against the edge of the seat 15—the pressure of the pressure medium in the control duct 12 acting on the area $F_s - F_d$ of the bottom side of the valve lid 4 exceeds the pressure on the top side of the valve lid 4 and creates a resulting upwardly directed force. The pressure medium thus causes the valve lid 4 to move upwardly closing the flow path from the chamber 3 to the flow duct 12 while opening the flow path from the control duct 12 to the discharge duct 13.

Referring to FIG. 2, wherein like reference characters indicate like parts as above, the mechanism may employ a locking means for locking the valve stem 5 in each of the end positions. As illustrated, the locking means includes a tapering locking pin 30 which cooperates with conical locking surfaces 31, 32 on a disc 33 secured to but at a distance from the end face of the valve stem 5.

The locking pin 30 forms a part of an armature 37 of an electromagnet 36 which forms the remainder of the mechanism for retaining the valve stem 5 and valve lid (not shown) in each end position thereof. As indicated, the electromagnet 36 is mounted within a separate casing on the valve casing 1. In addition, the electromagnet 36 includes a winding 35 which is connected by wiring 34 to a suitable power supply (not shown) and is disposed within a core 38. In addition, a spring 39 is provided between the armature 37 and the core 38 so as to bias the armature 37 and pin 30 in a direction away from the winding 35 and core 38 towards the valve stem 5.

When the electromagnet winding 35 is energized by a current pulse, the magnetic field produced by the current and shaped mainly by the core 38 attracts the armature 37 against the force of the spring 39 so that the pin 30 releases from the valve stem 5. The valve stem 5 is then moved under the forces imposed by the pressure medium flowing through the valve.

As shown, the casing of the electromagnet 36 is formed with an air vent aperture 40 so as to avoid any inaccuracies introduced by a change in pressure within the casing.

The mechanical locking can, of course, be embodied in some other way than by means of a locking pin provided that any such alternative is appropriate in terms of manufacturing tolerances and heat expansion and permanently applies a force against whichever valve seat is in operation, except when the system is in the triggered or activated state.

The invention thus provides a changeover valve which can be electronically controlled without the need for additional external drives.

The invention further provides a changeover valve which may be changed over from one end position to another utilizing the pressure medium to provide the changeover forces.

What is claimed is:

1. A changeover valve for controlling a throughflow of a pressure medium, said valve including
   a valve lid mounted between a pair of coaxially aligned stable end positions for loading at least on one side by the pressure medium to move between said end positions under the pressure of the pressure medium;
   a stem of given diameter secured to and extending from said lid;
   a pair of valve seats, each valve seat being disposed at a respective end position of said valve lid for seating of said valve lid thereon; said valve seat nearest said stem having a diameter greater than said stem diameter and said valve seat distal from said stem having a diameter less than said stem diameter;
   an inlet duct communicating with said valve seat nearest said stem for delivering a flow of pressure medium thereto;
   a discharge duct communication with said valve seat distal from said stem for discharging pressure medium therefrom;
   a control duct disposed between said inlet duct and said discharge duct for passing pressure medium to and from an element to be operated; and
   a mechanism for retaining said valve lid in each respective end position.

2. A changeover valve as set forth in claim 1 wherein said mechanism acts directly on said stem.

3. A changeover valve as set forth in claim 1 wherein said mechanism includes a locking pin for locking said stem in each of said end positions of said lid.

4. A changeover valve for controlling a throughflow of a pressure medium, said valve including
   a casing having an inlet duct for receiving a flow of pressure medium, a chamber communicating with said duct and a first valve seat at an exit end of said chamber;
   a base secured to said casing and having a recess aligned with said chamber to receive a flow of pressure medium therefrom, a control duct extending from said recess, a discharge duct extending from said recess and a second valve seat at an entrance end of said discharge duct;
   a valve lid disposed between said valve seats within said recess;
   a stem extending from said lid through said chamber, said stem having a diameter less than the diameter of said first valve seat and greater than the diameter of said second valve seat to permit the pressure of the pressure medium acting on said lid to move said lid from one valve seat to the other valve seat; and
   an electromagnet system for selectively retaining said valve lid on each respective valve seat.

5. A changeover valve as set forth in claim 4 wherein said electromagnet system includes an armature secured to said stem; a pair of permanent magnets, each magnet being disposed on an opposite side of said armature to retain said armature in a position corresponding to a respective end position of said lid; and a pair of windings, each winding being disposed on an opposite side of said armature to create a magnetic field in opposition to a respective permanent magnet in response to an electrical current passing therethrough to release said armature from said respective magnet.

6. A changeover valve for controlling a throughflow of a pressure medium, said valve including
   a casing having an inlet duct for receiving a flow of pressure medium, a chamber communicating with said duct and a first valve seat at an exit end of said chamber;
   a base secured to said casing and having a recess aligned with said chamber to receive a flow of pressure medium therefrom, a control duct extending from said recess, a discharge duct extending from said recess and a second valve seat at an entrance end of said discharge duct;
   a valve lid disposed between said valve seats within said recess, said valve lid being unconnected with said casing;
   a stem extending from said lid through said chamber having a diameter less than the diameter of said first valve seat and greater than the diameter of said second valve seat to permit the pressure of the pressure medium acting on said lid to move said lid from one valve seat to the other valve seat;
   a locking means for locking said stem in positions corresponding to said end positions of said lid; and
   an electromagnet for selectively releasing said locking means to permit movement of said lid to the other end position thereof.

7. A changeover valve as set forth in claim 4 wherein said inlet duct is disposed on the side of said lid facing said valve stem.

8. A changeover valve as set forth in claim 6 wherein said inlet duct is disposed on the side of said lid facing said valve stem.

* * * * *